(12) United States Patent
Yoo et al.

(10) Patent No.: US 8,897,236 B2
(45) Date of Patent: Nov. 25, 2014

(54) PHYSICAL DOWNLINK SHARED CHANNEL (PDSCH) PROTECTION

(75) Inventors: Taesang Yoo, San Diego, CA (US); Tao Luo, San Diego, CA (US); Yongbin Wei, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 709 days.

(21) Appl. No.: 13/071,145

(22) Filed: Mar. 24, 2011

(65) Prior Publication Data

US 2011/0235601 A1 Sep. 29, 2011

Related U.S. Application Data

(60) Provisional application No. 61/318,171, filed on Mar. 26, 2010.

(51) Int. Cl.
- *H04W 4/00* (2009.01)
- *H04J 3/00* (2006.01)
- *H04L 5/00* (2006.01)
- *H04W 72/08* (2009.01)

(52) U.S. Cl.
CPC ............ *H04L 5/0053* (2013.01); *H04W 72/082* (2013.01); *H04L 5/0073* (2013.01)
USPC .............................. 370/329; 370/330; 370/336

(58) Field of Classification Search
None
See application file for complete search history.

(56) References Cited

U.S. PATENT DOCUMENTS

| | | | |
|---|---|---|---|
| 2007/0232349 | A1 | 10/2007 | Jones et al. |
| 2009/0046672 | A1* | 2/2009 | Malladi et al. ................ 370/336 |
| 2009/0325626 | A1 | 12/2009 | Palanki et al. |
| 2010/0035600 | A1* | 2/2010 | Hou et al. ................... 455/422.1 |
| 2010/0099429 | A1 | 4/2010 | Ishii et al. |
| 2012/0329400 | A1* | 12/2012 | Seo et al. ..................... 455/63.1 |

FOREIGN PATENT DOCUMENTS

| | | |
|---|---|---|
| CN | 101449603 A | 6/2009 |
| WO | 2008108228 A1 | 9/2008 |

OTHER PUBLICATIONS

International Search Report and Written Opinion—PCT/US2011/030002—ISA/EPO—Jul. 18, 2011.
Zyren Jim. "Overview of the 3GPP Long Term Evolution Physical Layer" white Paper. 27 pages, Jul. 2007.
Taiwan Search Report—TW100110379—TIPO—Nov. 1, 2013.

\* cited by examiner

*Primary Examiner* — Chirag Shah
*Assistant Examiner* — Srinivasa Reddivalam
(74) *Attorney, Agent, or Firm* — Kenneth Vu; Ashish L. Patel

(57) ABSTRACT

According to certain aspects, resource blocks used for physical downlink shared channel (PDSCH) transmissions may be allocated in a manner to manage interference in neighboring cells. According to certain aspects, one or more guard RBs may be utilized when transmitting PDSCH in a first cell an effort to reduce interference by transmissions in a second cell.

30 Claims, 12 Drawing Sheets

PHYSICAL DOWNLINK SHARED CHANNEL (PDSCH) PROTECTION

CROSS-REFERENCE TO RELATED APPLICATIONS

This application claims priority to U.S. Provisional Application Ser. No. 61/318,171, entitled "APPARATUS AND METHOD FOR PHYSICAL DOWNLINK SHARED CHANNEL (PDSCH) PROTECTION USING GUARD RESOURCE BLOCKS (RBs)," filed on Mar. 26, 2010, which is expressly incorporated by reference herein in its entirety.

BACKGROUND

I. Field

The present disclosure generally relates to communication and, more specifically, to techniques for managing interference by controlling transmission power.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that may support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data to one or more UEs on the downlink and may receive data from one or more UEs on the uplink. On the downlink, a data transmission from the base station may observe interference due to data transmissions from neighbor base stations. On the uplink, a data transmission from a UE may observe interference due to data transmissions from other UEs communicating with the neighbor base stations. For both the downlink and uplink, the interference due to the interfering base stations and the interfering UEs may degrade performance.

SUMMARY

According to certain aspects, a method for wireless communication in a wireless communications network in which at least first and second base stations share resource blocks (RBs) via a frequency division multiplexing (FDM) scheme is provided. The method generally includes identifying, by the first base station, a set of resource blocks (RBs) for transmitting a physical downlink shared channel (PDSCH), wherein the base station of the second cell is scheduled to limit transmissions using the identified set of RBs and identifying one or more guard RBs surrounding the identified set of RBs and transmitting the PDSCH using the identified RBs with limited or no transmissions by either the first or second base stations in the guard RBs mitigating interference in a wireless communications network is provided.

According to certain aspects, a method for wireless communication in a system in which at least first and second base stations share resource blocks (RBs) via a frequency division multiplexing (FDM) scheme. The method generally includes receiving, from the first base station, a set of resource blocks (RBs) allocated for a physical downlink shared channel (PDSCH), wherein the base station of the second cell is scheduled to limit transmissions using the identified set of RBs and decoding the PDSCH using only a subset of the set of RBs allocated for the PDSCH, wherein the subset does not include one or more RBs at either edge of the set of RBs allocated for the PDSCH.

According to certain aspects, an apparatus for wireless communication in a wireless communications network in which at least first and second base stations share resource blocks (RBs) via a frequency division multiplexing (FDM) scheme is provided. The apparatus generally includes means for identifying, by the first base station, a set of resource blocks (RBs) for transmitting a physical downlink shared channel (PDSCH), wherein the base station of the second cell is scheduled to limit transmissions using the identified set of RBs, means for identifying one or more guard RBs surrounding the identified set of RBs, and means for transmitting the PDSCH using the identified RBs with limited or no transmissions by either the first or second base stations in the guard RBs mitigating interference in a wireless communications network is provided.

According to certain aspects, an apparatus for wireless communication in a system in which at least first and second base stations share resource blocks (RBs) via a frequency division multiplexing (FDM) scheme. The apparatus generally includes means for receiving, from the first base station, a set of resource blocks (RBs) allocated for a physical downlink shared channel (PDSCH), wherein the base station of the second cell is scheduled to limit transmissions using the identified set of RBs and means for decoding the PDSCH using only a subset of the set of RBs allocated for the PDSCH, wherein the subset does not include one or more RBs at either edge of the set of RBs allocated for the PDSCH.

According to certain aspects, an apparatus for wireless communication in a wireless communications network in which at least first and second base stations share resource blocks (RBs) via a frequency division multiplexing (FDM) scheme is provided. The apparatus generally includes at least one processor configured to identify, at the first base station, a set of resource blocks (RBs) for transmitting a physical downlink shared channel (PDSCH), wherein the base station of the second cell is scheduled to limit transmissions using the identified set of RBs, identify one or more guard RBs surrounding the identified set of RBs, and transmit the PDSCH using the identified RBs with limited or no transmissions by either the first or second base stations in the guard RB; and a memory coupled with the at least one apparatus.

According to certain aspects, an apparatus for wireless communication in a system in which at least first and second base stations share resource blocks (RBs) via a frequency division multiplexing (FDM) scheme. The apparatus generally includes at least one processor configured to receive, from the first base station, a set of resource blocks (RBs) allocated for a physical downlink shared channel (PDSCH), wherein the base station of the second cell is scheduled to limit transmissions using the identified set of RBs and decode the PDSCH using only a subset of the set of RBs allocated for the PDSCH, wherein the subset does not include one or more RBs at either edge of the set of RBs allocated for the PDSCH; and a memory coupled with the at least one processor.

According to certain aspects, a computer program product comprising a computer readable medium with instruction for wireless communication in a wireless communications network in which at least first and second base stations share resource blocks (RBs) via a frequency division multiplexing (FDM) scheme is provided. The instructions are generally executable by one or more processors for identifying, by the first base station, a set of resource blocks (RBs) for transmitting a physical downlink shared channel (PDSCH), wherein the base station of the second cell is scheduled to limit transmissions using the identified set of RBs and identifying one or more guard RBs surrounding the identified set of RBs and transmitting the PDSCH using the identified RBs with limited or no transmissions by either the first or second base stations in the guard RBs mitigating interference in a wireless communications network is provided.

According to certain aspects, a computer program product comprising a computer readable medium with instruction for wireless communication in a wireless communications network in which at least first and second base stations share resource blocks (RBs) via a frequency division multiplexing (FDM) scheme is provided. The instructions are generally executable by one or more processors for receiving, from the first base station, a set of resource blocks (RBs) allocated for a physical downlink shared channel (PDSCH), wherein the base station of the second cell is scheduled to limit transmissions using the identified set of RBs and decoding the PDSCH using only a subset of the set of RBs allocated for the PDSCH, wherein the subset does not include one or more RBs at either edge of the set of RBs allocated for the PDSCH.

Various aspects and features of the disclosure are described in further detail below.

DETAILED DESCRIPTION

Techniques for managing interference by allocating and processing resource blocks (RBs) potentially subject to interference are described herein. The RBs may be shared by at least first and second base stations via a frequency division multiplexing (FDM) scheme.

According to certain aspects, a first base station may utilize one or more guard RBs surrounding a set of RBs used to transmit a physical downlink shared channel. The PDSCH may be transmitted with limited or no transmissions by either the first base station or a second base station in the guard RBs. In this manner, interference when transmitting the PDSCH may be reduced.

According to certain aspects, a first base station may utilize one or more guard RBs surrounding a set of RBs used to transmit a physical downlink shared channel. The PDSCH may be transmitted with limited or no transmissions by either the first base station or a second base station in the guard RBs. In this manner, interference when transmitting the PDSCH may be reduced.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
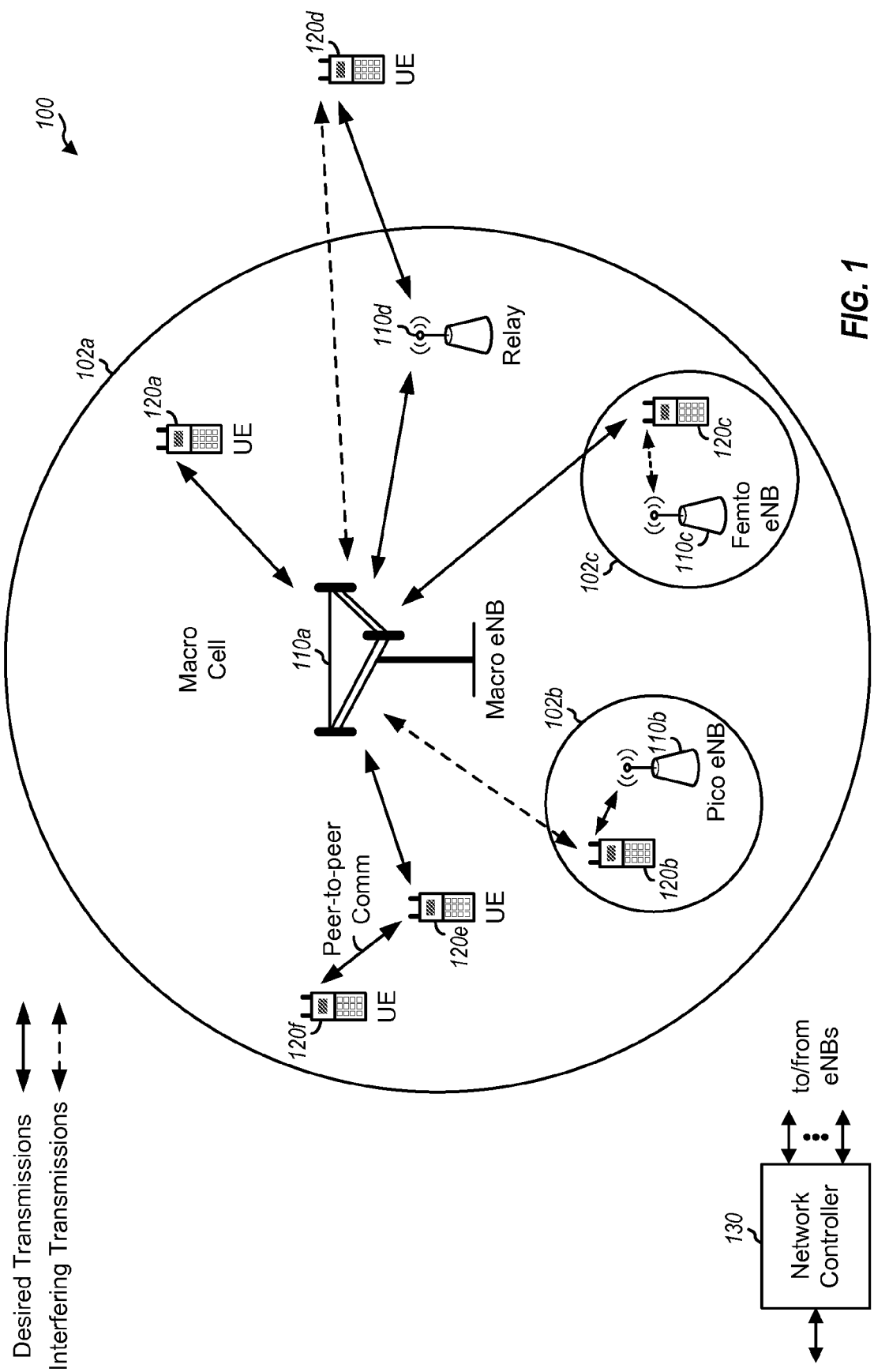
FIG. 1 shows a wireless communication network.

FIG. 1 shows a wireless communication network 100, which may be an LTE network or some other wireless network. The interference management techniques presented herein may be used in such a system.

Wireless network 100 may include a number of evolved Node Bs (eNBs) 110 and other network entities. An eNB may be an entity that communicates with the UEs and may also be referred to as a base station, a Node B, an access point, etc. Each eNB may provide communication coverage for a particular geographic area. In 3GPP, the term "cell" may refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a home eNB (HeNB) or a femto eNB. In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station", and "cell" may be used interchangeably herein.

Wireless network 100 may also include relays. A relay may be an entity that may receive a transmission of data from an upstream station (e.g., an eNB or a UE) and send a transmission of the data to a downstream station (e.g., a UE or an eNB). A relay may also be a UE that may relay transmissions for other UEs. In the example shown in FIG. 1, a relay 110d may communicate with macro eNB 110a via a backhaul link and with a UE 120d via an access link in order to facilitate communication between eNB 110a and UE 120d. A relay may also be referred to as a relay eNB, a relay station, a relay base station, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage sizes, and different impact on interference in wireless network 100. For example, macro eNBs may have a high transmit power level (e.g., 5 to 40 Watts) whereas pico eNBs, femto eNBs, and relays may have lower transmit power levels (e.g., 0.1 to 2 Watts).

A network controller 130 may couple to a set of eNBs and may provide coordination and control for these eNBs. Network controller 130 may comprise a single network entity or a collection of network entities. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with macro eNBs, pico eNBs, femto eNBs, relays, etc. A UE may also be able to communicate peer-to-peer (P2P) with another UE. In the example shown in FIG. 1, UEs 120e and 120f may communicate directly with each other without communicating with an eNB in wireless network 100. P2P communication may reduce the load on wireless network 100 for local communications between UEs. P2P communication between UEs may also allow one UE to act as a relay for another UE, thereby enabling the other UE to connect to an eNB.

In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric.

A UE may operate in a dominant interference scenario in which the UE may observe high interference from one or more interfering eNBs. A dominant interference scenario may occur due to restricted association. For example, in FIG. 1, UE 120c may be close to femto eNB 110c and may have high received power for eNB 110c. However, UE 120c may not be able to access femto eNB 110c due to restricted association and may then connect to macro eNB 110a with lower received power. UE 120c may then observe high interference from femto eNB 110c on the downlink and may also cause high interference to femto eNB 110c on the uplink.

A dominant interference scenario may also occur due to range extension, which is a scenario in which a UE connects to an eNB with lower pathloss and possibly lower SINR among all eNBs detected by the UE. For example, in FIG. 1, UE 120b may be located closer to pico eNB 110b than macro eNB 110a and may have lower pathloss for pico eNB 110b. However, UE 120b may have lower received power for pico eNB 110b than macro eNB 110a due to a lower transmit power level of pico eNB 110b as compared to macro eNB 110a. Nevertheless, it may be desirable for UE 120b to connect to pico eNB 110b due to the lower pathloss. This may result in less interference to the wireless network for a given data rate for UE 120b.

Various interference management techniques may be used to support communication in a dominant interference scenario. These interference management techniques may include semi-static resource partitioning (which may be referred to as inter-cell interference coordination (ICIC)), dynamic resource allocation, interference cancellation, etc. Semi-static resource partitioning may be performed (e.g., via backhaul negotiation) to allocate resources to different cells. The resources may comprise subframes, subbands, carriers, resource blocks, transmit power, etc. Each cell may be allocated a set of resources that may observe little or no interference from other cells or their UEs. Dynamic resource allocation may also be performed (e.g., via exchange of over-the-air messages between cells and UEs) to allocate resources as needed to support communication for UEs observing strong interference on the downlink and/or uplink. Interference cancellation may also be performed by UEs to mitigate interference from interfering cells.

Wireless network 100 may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single HARQ interlace, which may include every Q-th subframes, where Q may be equal to 4, 6, 8, 10, or some other value. For asynchronous HARQ, each transmission of the packet may be sent in any subframe.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 100 may utilize FDD or TDD. For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods.

Figure 2:
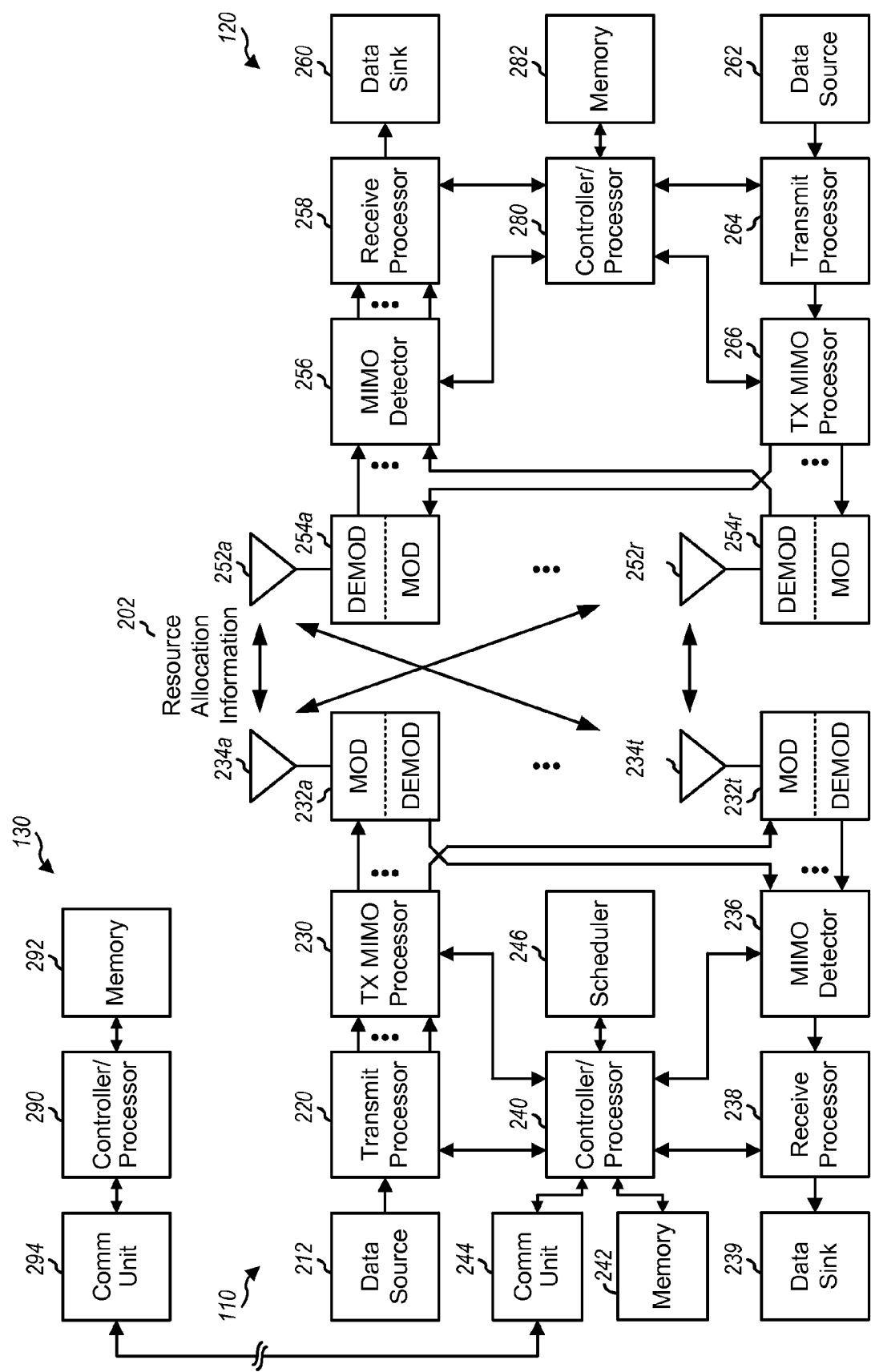
FIG. 2 shows a block diagram of a base station and a UE.

FIG. 2 shows a block diagram of a design of a base station/eNB 110 and a UE 120, which may be one of the base stations/eNBs and one of the UEs in FIG. 1. The various components (e.g., processors) shown in FIG. 2 may be utilized to perform the interference management techniques described herein. As illustrated, the base station 110 and UE may exchange resource allocation information 202. As will be described in greater detail below, the resource allocation information 202 may include an indication of RBs to be used by the base station 110 for transmitting a PDSCH and, in some cases, may indicate guard RBs to use when transmitting the PDSCH.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs and control information from a controller/processor 240. Processor 220 may process (e.g., encode and modulate) the data and control information to obtain data symbols and control symbols, respectively. Processor 220 may also generate reference symbols for synchronization signals, reference signals, etc. A transmit (TX) multiple-input multiple-output (MIMO) processor 230 may perform spatial processing (e.g., precoding) on the data symbols, the control symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110, downlink signals from other base stations, and/or P2P signals from other UEs and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information to a controller/processor 280.

On the uplink, at UE 120, a transmit processor 264 may receive data from a data source 262 and control information from controller/processor 280. Processor 264 may process (e.g., encode and modulate) the data and control information to obtain data symbols and control symbols, respectively. Processor 264 may also generate reference symbols for one or more reference signals, etc. The symbols from transmit processor 264 may be precoded by a TX MIMO processor 266 if applicable, further processed by modulators 254a through 254r (e.g., for SC-FDM, OFDM, etc.), and transmitted to base station 110, other base stations, and/or other UEs. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120 and other UEs. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct processing for the techniques described herein. Processor 280 and/or other processors and modules at UE 120 may perform or direct processing for the techniques described herein. Memories 242 and 282 may store data and program codes for base station 110 and UE 120, respectively. A communication (Comm) unit 244 may enable base station 110 to communicate with other network entities (e.g., network controller 130). A scheduler 246 may schedule UEs for data transmission on the downlink and/or uplink.

According to certain aspects, the receive processor 238 and/or controller/processor 240 may determine resource allocation information 202 and provide this information to the transmit processor 220 for transmission to the UE 120. In turn, the receive processor 258 and/or controller processor 280 of the UE 120 may extract the resource allocation information and process a PDSCH transmission accordingly.

FIG. 2 also shows a design of network controller 130 in FIG. 1. Within network controller 130, a controller/processor 290 may perform various functions to support communication for UEs. Controller/processor 290 may perform processing for the techniques described herein. A memory 292 may store program codes and data for network controller 130. A communication unit 294 may enable network controller 130 to communicate with other network entities.

As noted above, the BS 110 and UE 120 may utilize FDD or TDD. For FDD, the downlink and uplink may be allocated separate frequency channels, and downlink transmissions and uplink transmissions may be sent concurrently on the two frequency channels.

Figure 3:
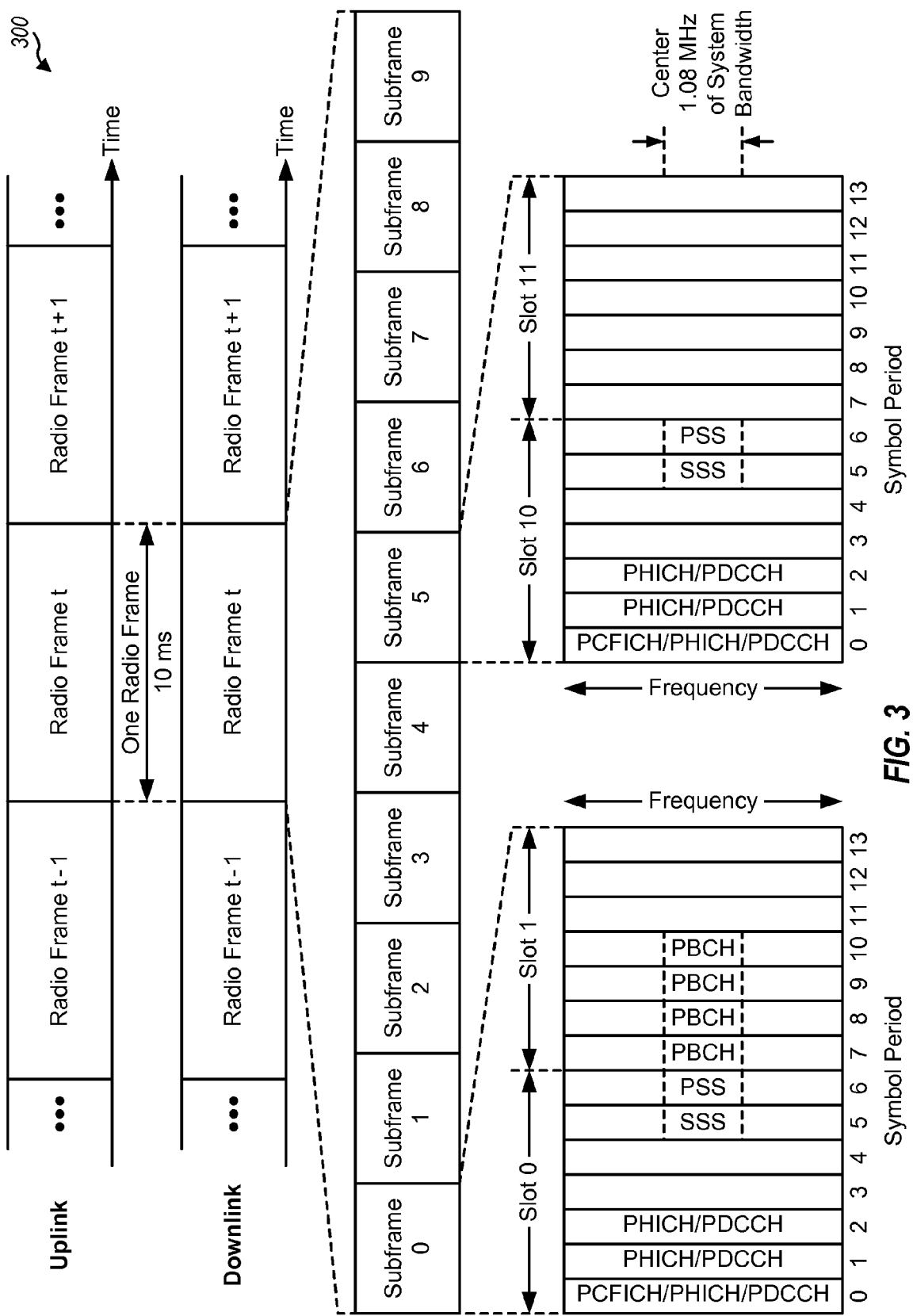
FIG. 3 shows a frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 356, 512, 1024 or 2048 for system bandwidth of 1.25, 2.5, 5, 10 or 20 megahertz (MHz), respectively. The system bandwidth may also be partitioned into a number of subbands, and each subband may cover a range of frequencies, e.g., 1.08 MHz.

The available time frequency resources for each of the downlink and uplink may be partitioned into resource blocks.

Each resource block may cover 12 subcarriers in one slot and may include a number of resource elements. Each resource element may cover one subcarrier in one symbol period and may be used to send one modulation symbol, which may be a real or complex value.

In LTE, an eNB may transmit a Physical Control Format Indicator Channel (PCFICH), a Physical HARQ Indicator Channel (PHICH), and a Physical Downlink Control Channel (PDCCH) in a control region of a subframe. The PCFICH may convey the size of the control region. The PHICH may carry acknowledgement (ACK) and negative acknowledgement (NACK) feedback for data transmission sent on the uplink with HARQ. The PDCCH may carry downlink grants, uplink grants, and/or other control information. The eNB may also transmit a Physical Downlink Shared Channel (PDSCH) in a data region of a subframe (not shown in FIG. 3). The PDSCH may carry data for UEs scheduled for data transmission on the downlink.

In LTE, an eNB may also transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by the UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as system information blocks (SIBs) on the PDSCH in certain subframes.

Figure 4:
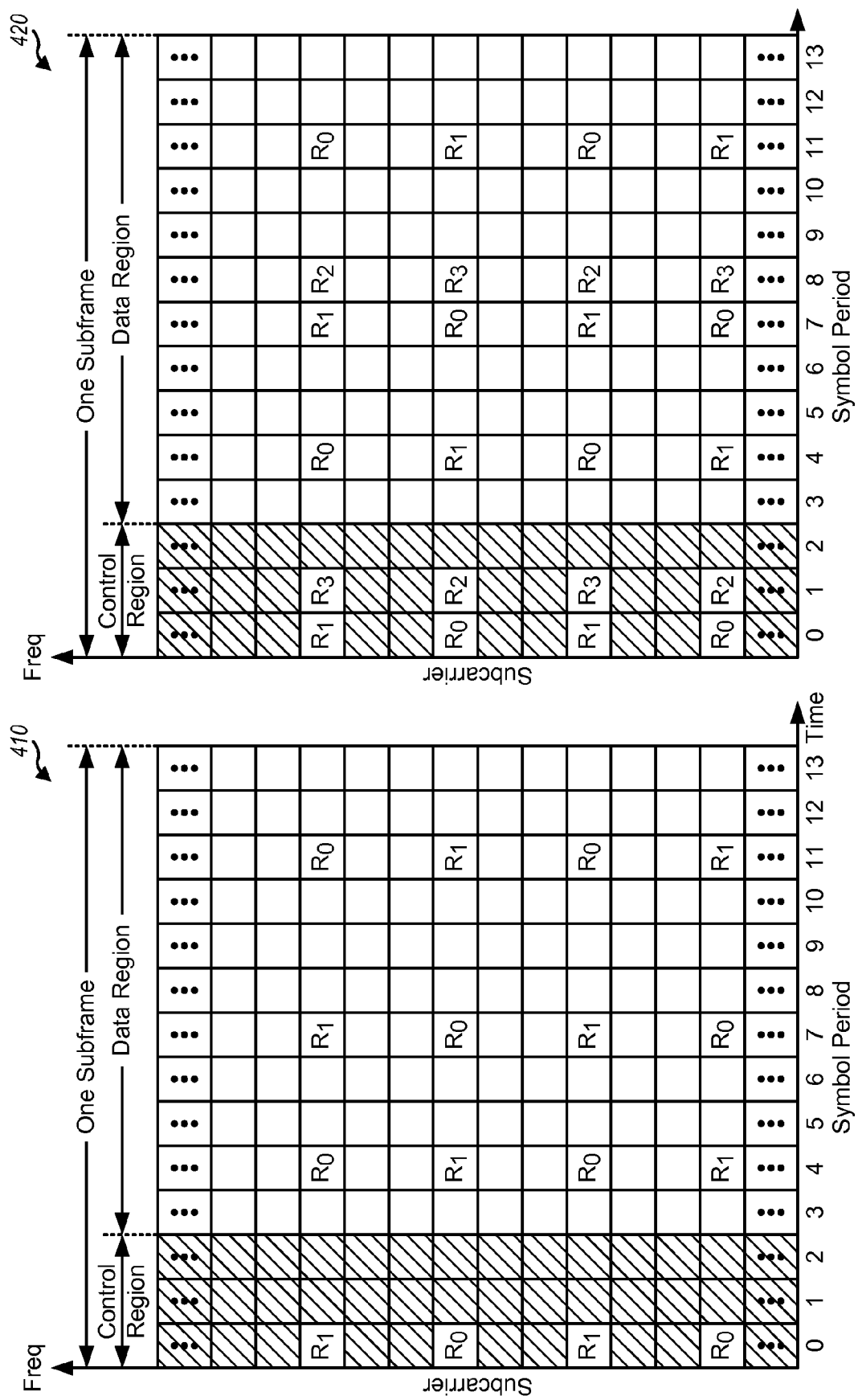
FIG. 4 shows two exemplary subframe formats for the downlink.

FIG. 4 shows two exemplary subframe formats 410 and 420 for the downlink with the normal cyclic prefix in LTE. A subframe for the downlink may include a control region followed by a data region, which may be time division multiplexed. The control region may include the first M symbol periods of the subframe, where M may be equal to 1, 2, 3 or 4. M may change from subframe to subframe and may be conveyed by the PCFICH in the first symbol period of the subframe. The control region may carry control information. The data region may include the remaining 2L−M symbol periods of the subframe and may carry data and/or other information.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on the cell ID. Different eNBs may transmit CRSs for their cells on the same or different subcarriers, depending on the cell IDs of these cells. For both subframe formats 410 and 420, resource elements not used for the CRS may be used to transmit data or control information.

Figure 5:
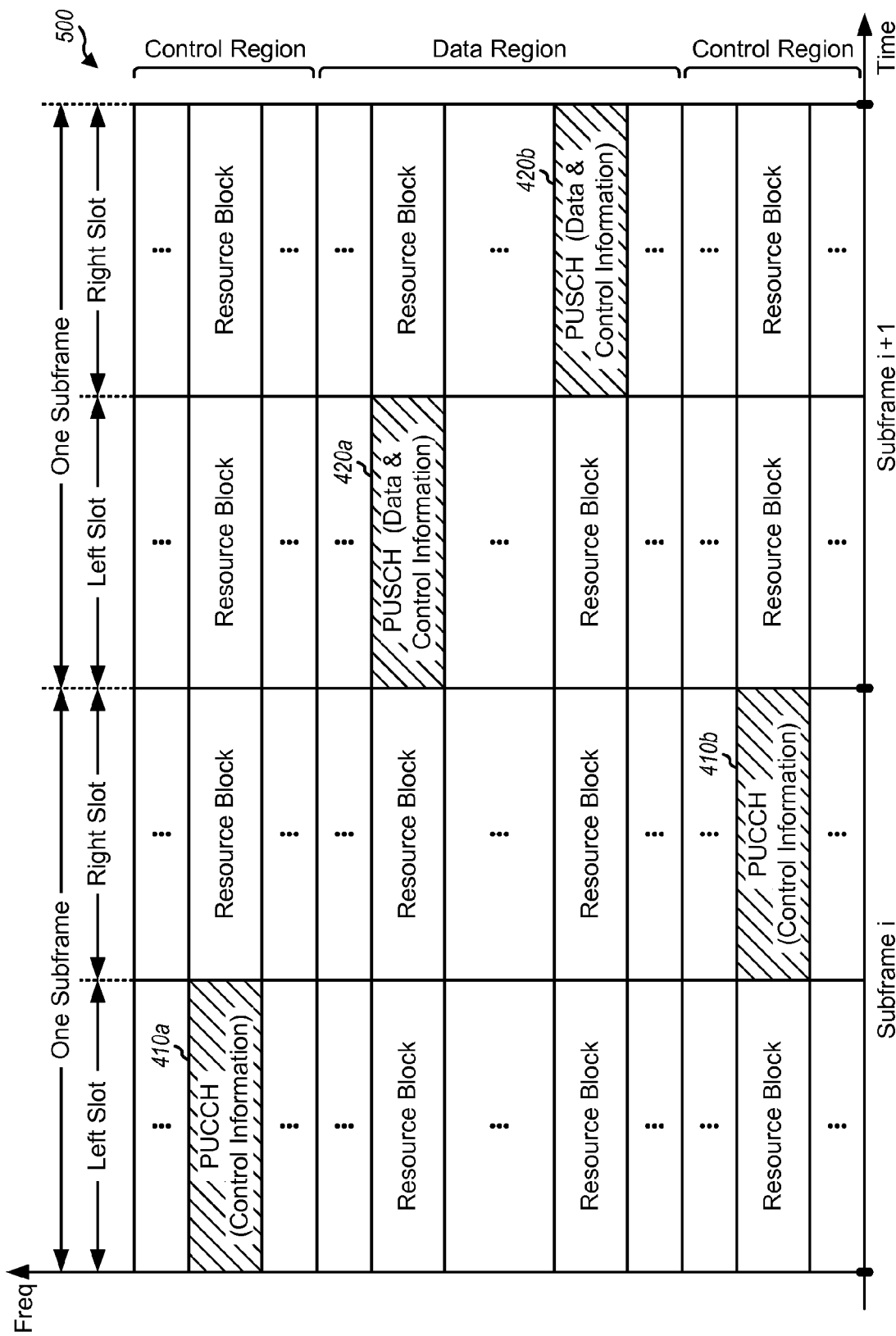
FIG. 5 shows an exemplary subframe format for the uplink.

FIG. 5 shows an exemplary subframe format 400 for the uplink in LTE. A subframe for the uplink may include a control region and a data region, which may be frequency division multiplexed. The control region may be formed at the two edges of the system bandwidth and may have a configurable size. The data region may include all resource blocks not included in the control region.

A UE may be assigned resource blocks in the control region to send control information to an eNB. The UE may also be assigned resource blocks in the data region to send data to the eNB. The UE may send control information on a Physical Uplink Control Channel (PUCCH) on assigned resource blocks 510a and 510b in the control region. The UE may send only data, or both data and control information, on a Physical Uplink Shared Channel (PUSCH) on assigned resource blocks 520a and 520b in the data region. An uplink transmission may span both slots of a subframe and may hop across frequency, as shown in FIG. 5.

Figure 6:
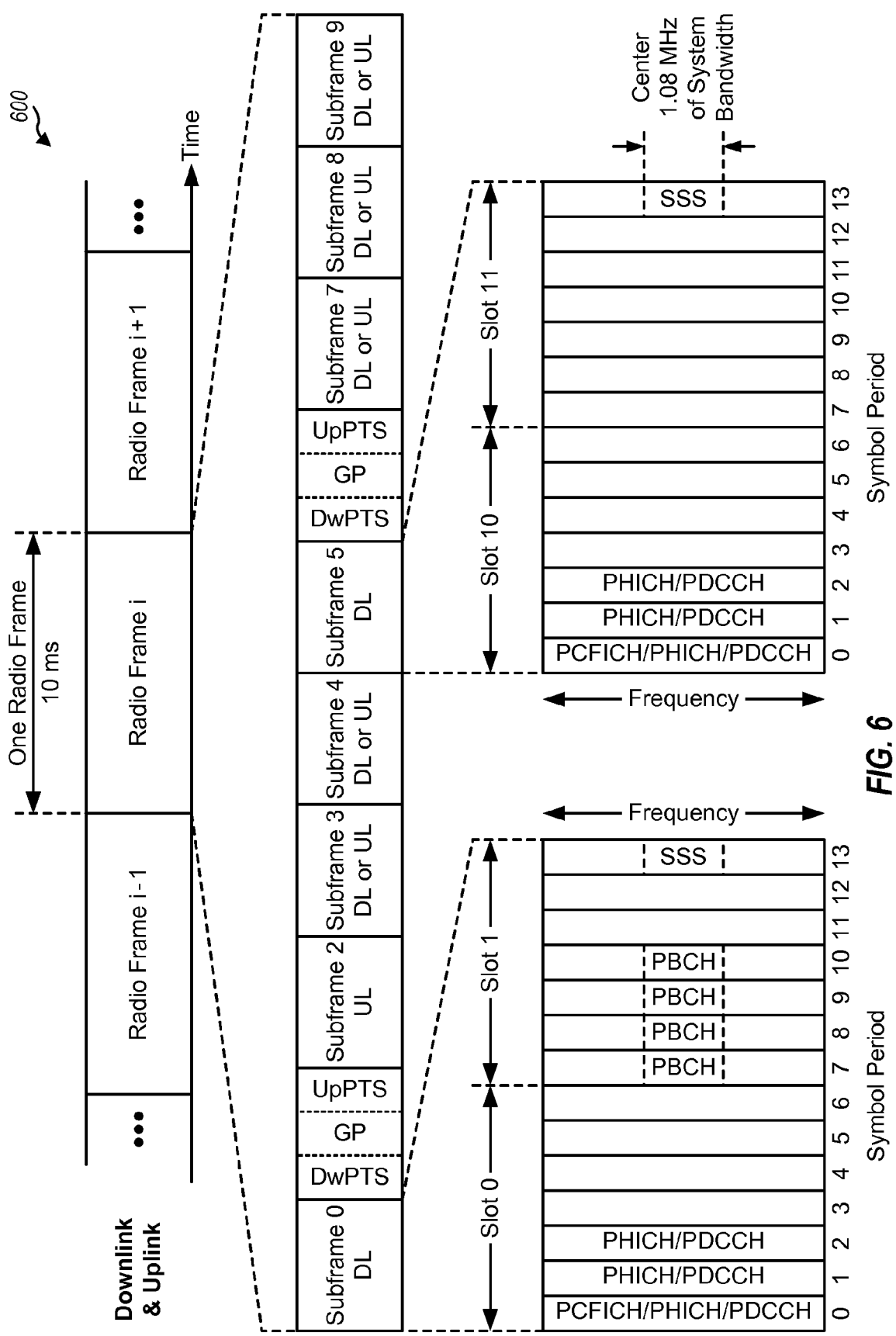
FIG. 6 shows a frame structure for time division duplexing (TDD).

FIG. 6 shows an exemplary frame structure 600 for TDD in LTE. LTE supports a number of downlink-uplink configurations for TDD. Subframes 0 and 5 are used for the downlink (DL) and subframe 2 is used for the uplink (UL) for all downlink-uplink configurations. Subframes 3, 4, 7, 8 and 9 may each be used for the downlink or uplink depending on the downlink-uplink configuration. Subframe 1 includes three special fields composed of (i) a Downlink Pilot Time Slot (DwPTS) used for downlink control channels as well as data transmissions, (ii) a Guard Period (GP) of no transmission, and (iii) an Uplink Pilot Time Slot (UpPTS) used for either a Random Access Channel (RACH) or sounding reference signals (SRS). Subframe 6 may include only the DwPTS, or all three special fields, or a downlink subframe depending on the downlink-uplink configuration. The DwPTS, GP and UpPTS may have different durations for different subframe configurations.

On the downlink, an eNB may transmit the PSS in symbol period 2 of subframes 1 and 6 (not shown in FIG. 6), and the SSS in the last symbol period of subframes 0 and 5. The eNB may transmit the CRS in certain symbol periods of each downlink subframe. The eNB may also transmit the PBCH in subframe 0 of certain radio frames.

The various frame structures, subframe formats, physical channels, and signals in LTE are described in 3GPP TS 36.211, entitled "Evolved Universal Terrestrial Radio Access (E-UTRA); Physical Channels and Modulation," which is publicly available.

Those skilled in the art will recognize that the interference management techniques presented herein may be implemented using any suitable combination of hardware and/or software components. According to certain aspects, various operations of such techniques may be implemented using one or more "software configurable" programmable processors.

Protecting PDSCH Transmissions

Certain aspects of the present disclosure provide interference management by strategic allocation of RBs that are shared between base stations, for example, utilizing FDM. According to certain aspects, a base station may utilize guard RBs when transmitting a PDSCH in an effort to avoid interference. According to certain aspects, a UE may ignore certain RBs containing PDSCH information when decoding a PDSCH.

For control channels and unicast PDSCH transmissions, one proposed approach to manage interference is a TDM partitioning approach. According to this approach, subframes may be partitioned into different sets to each power class (e.g., macro, femto, pico), and a cell may be allowed to transmit control channels and unicast PDSCH using only the subframes assigned to it. In this approach, a UE may transmit or receive data from a weak cell without suffering from interference from a stronger cell (that limits or avoids transmissions during "protected" subframes).

Unfortunately, SIB1 and paging messages (these are PDSCHs broadcast to UEs in the cell) may need to be sent at pre-scheduled instances that may not fall into one of the assigned protected subframes. For example, SIB1 may be transmitted from a designated subframe (e.g., subframe 5) of every even radio frame from all cells and, therefore, SIB1 cannot readily follow the TDM partitioning rule. As a result, SIB1 and paging messages transmitted on non-assigned subframes from a weak cell may not be successfully decoded at the UE, in cases where there is strong interference from a stronger cell. Similarly, the PDCCH accompanying the SIB1 and paging may also not be decoded at the UE.

Various other solutions for PDCCH decoding that do not involve TDM partitioning may be utilized. Examples of such solutions may include "PDCCH-less operation" to avoid PDCCH decoding altogether at times, cross-subframe PDCCH assignment to provide PDCCH on a different (assigned) subframe, and alternative ways to obtain modulation coding scheme (MCS) and RB info for SIB1/paging.

Figure 7A:
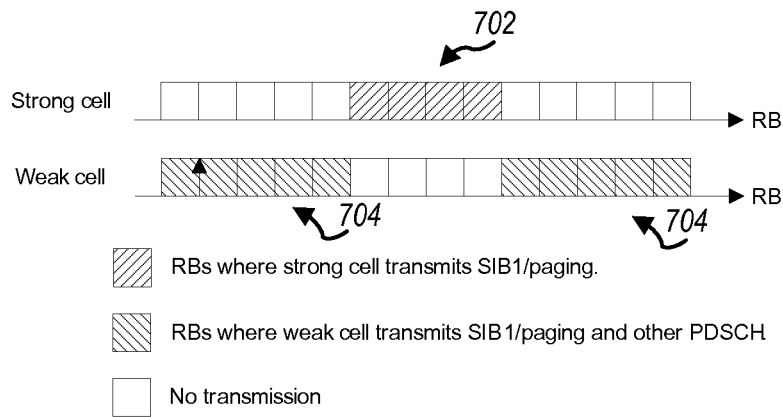
FIGS. 7A and 7B show examples of potential interference of resource blocks (RBs) utilized in adjacent cells, that may be addressed utilizing certain aspects of the present disclosure.
Figure 7B:
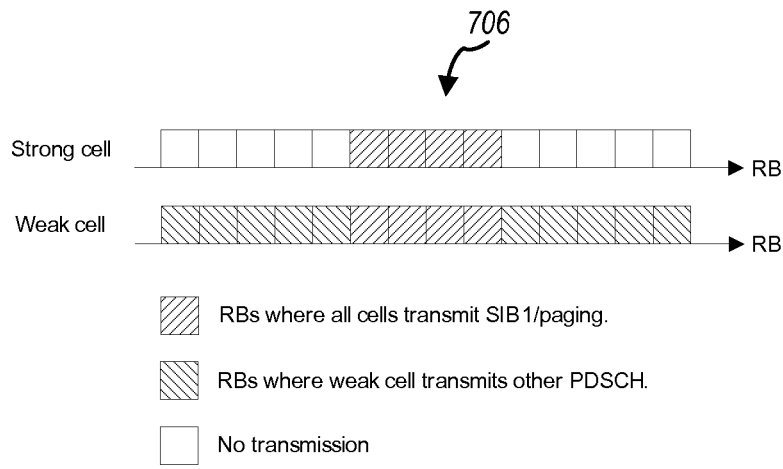

Various other solutions for SIB1/paging decoding that do not involve TDM partitioning may also be utilized. Examples of such solutions may include techniques which orthogonalize SIB1/paging transmission across cells in a frequency division multiplex (FDM) manner. FIG. 7A illustrates an example of SIB1/paging orthogonalization in a weak cell-strong cell scenario. As illustrated, a set of RBs 702 used for PDSCH transmissions in a weaker cell may be chosen so they do not overlap with a set of RBs 704 used for PDSCH transmissions in a stronger cell. As illustrated in FIG. 7B, a common set of overlapping RBs 706 may be utilized by both cells and SIB1/paging transmissions may be allowed to collide across cells, and the UE may be left to rely on IC to decode them. However, this approach may be limited in systems in which not all UEs are capable of IC.

Further, in a scenario that UE from a weaker cell may need to decode SIB1/paging in a subframe where a stronger cell may send PDSCH, a UE may be forced to use narrowband channel estimation, relying only on those common RS (CRS) tones in the RBs that convey SIB1/paging, as RS tones outside those RBs may be severely interfered and cannot be relied upon. In the opposite scenario, where a cell is a dominant interferer to the neighboring cells and the cell transmits SIB1/paging on non-assigned subframes, the SIB1/paging transmission may cause severe interference to the neighboring cells on RBs adjacent to RBs used for the SIB1/paging transmission.

According to certain aspects, techniques are provided that may involve PDSCH orthogonalization that allows for broadband channel estimation (i.e., channel estimation using all CRS tones in frequency domain, that is, using CRS tones both inside and outside the RBs conveying SIB 1/paging). According to certain aspects, the techniques may be applied to different types of PDSCH (e.g., a SIB1 or paging/msg2). According to certain aspects, a base station may transmit a PDSCH with additional guard bands. Additionally, or as an alternative, a UE may ignore one or more RBs used for transmitting a PDSCH, when decoding the PDSCH.

Figure 8:
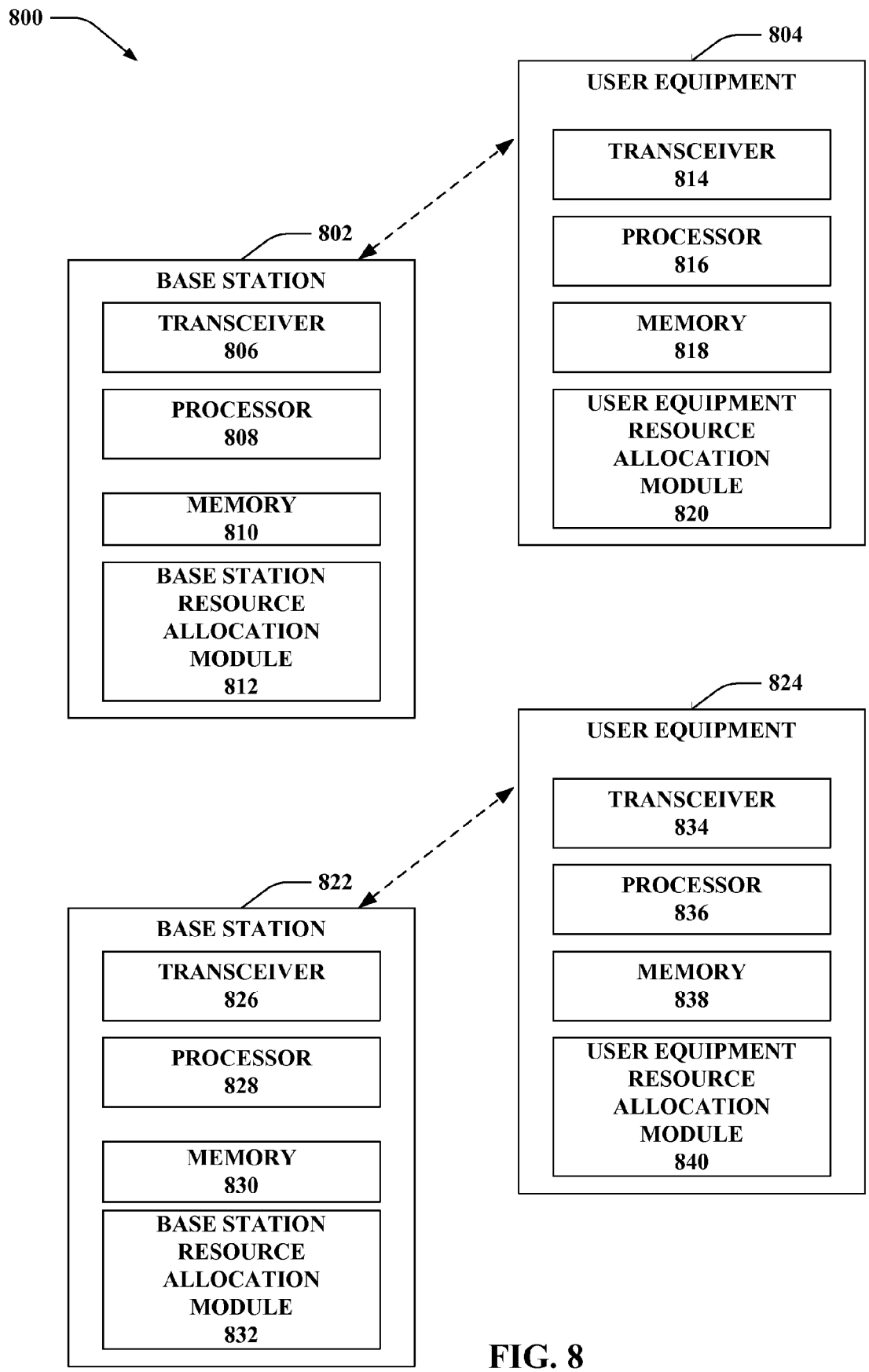
FIG. 8 shows example functional components of a base station and a UE, in accordance with certain aspects of the present disclosure.

FIG. 8 illustrates an example communication system 800 in which the interference management techniques described herein may be utilized. As illustrated, the wireless communication system 800 may include BSs 802, 822 and UEs 804, 824 served by BS 802, 822, respectively. BSs 802, 822 may be located in different cells that potentially interfere with each other. According to certain aspects, the communication system 800 may be a heterogeneous network and the BSs 802, 822 may be a combination of a macro BS, a Femto BS, a pico BS, and the like. According to certain aspects, the wireless communication system 800 may be an LTE or an LTE-A system.

BSs 802, 822 may include transceivers 806, 816 configured to transmit and receive data and/or control information and/or any other type of information described herein with reference to any of the systems, methods, apparatus and/or computer program products to and from UEs 804, 824, respectively. For example, transceivers 806, 816 may be configured to transmit and/or receive time and/or frequency resource partitioning information, data, and control channels.

BSs 802, 822 may also include various processors 808, 828 and memory 810, 830. Processors 808, 828 may be configured to perform one or more of the interference management functions described herein. The BSs 802, 822 may include memory 810, 830, for example, each storing instructions executable by the processors 808, 828, to perform various operations described herein.

BSs 802, 822 may also include BS resource allocation modules 812, 832 configured to allocate resources for interference management. The resources allocated may include, but are not limited to, time and/or frequency transmission resources. For example, the resource allocation modules 812, 832 may be configured to transmit, generate and/or process resource partitioning information between different power classes of BSs. According to certain aspects, the resource allocation modules 812, 832 may be configured to generate power control information for interference management as described herein.

The wireless communication system 800 may also include UEs 804, 824 served by BSs 802, 822, respectively, and located in corresponding cells managed by BSs 802, 822.

UEs 804, 824 may include transceivers 814, 834 configured to transmit and receive data and/or control information and/or any other type of information described herein to and from BSs 802, 822, respectively. For example, transceivers 814, 834 may be configured to transmit and/or receive time and/or frequency resource partitioning information and power control information to vary transmission power of uplink transmissions in different types of subframes. According to certain aspects, transceivers 814, 834 may be configured to transmit in different types of subframes including, but not limited to, usable, non-usable and flexibly usable subframes. Transceivers 814, 834 may be configured to receive data and control channels.

UEs 804, 824 may also include various processors 816, 836 and memory 818, 838. Processors 816, 836 may be configured to perform one or more of the functions described herein with reference to any of the systems, methods, apparatus and/or computer program products. The UEs 804, 824 may include memory 818, 838 for example, each storing instructions executable by the processors 816, 836, to perform various operations described herein.

UEs 804, 824 may also include UE resource allocation modules 820, 840 configured to receive and process resource allocation information for interference management. For example, the UE resource allocation modules 820, 840 may be configured to receive and process resource partitioning information between different power classes of BSs. According to certain aspects, the resource allocation modules 820, 840 may also be configured to receive resource allocation information and decode PDSCH transmissions.

Figure 9:
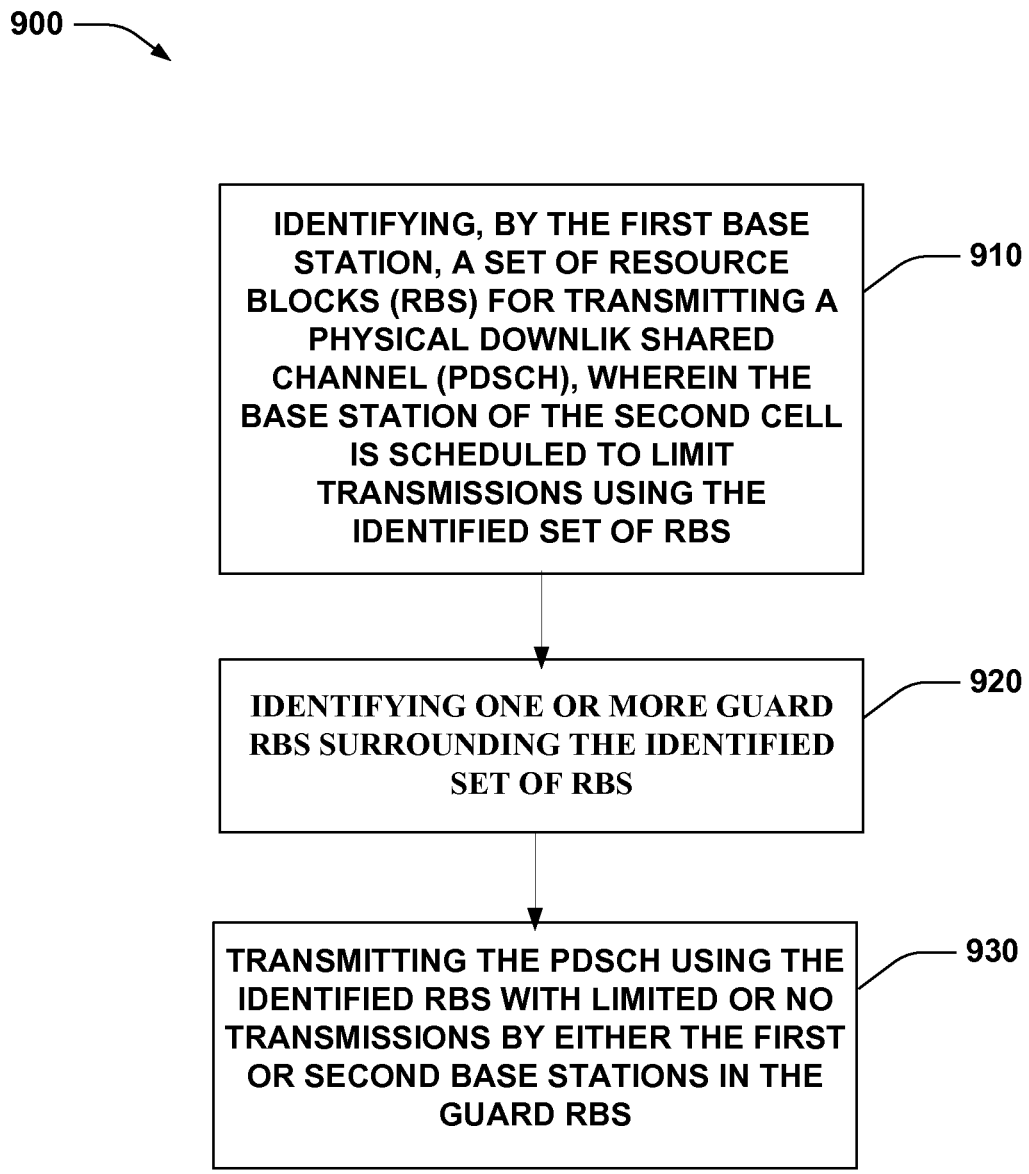
FIG. 9 shows example operations that may be performed by a BS, in accordance with certain aspects of the present disclosure.

FIG. 9 illustrates example operations 900 for wireless communication in a wireless communications network in which at least first and second base stations share resource blocks (RBs) via a frequency division multiplexing (FDM) scheme. The operations 800 may be performed, for example, by the first base station. The operations 800 begin, at 802, by identifying, by the first base station, a set of resource blocks (RBs) for transmitting a physical downlink shared channel (PDSCH), wherein the base station of the second cell is scheduled to limit transmissions using the identified set of RBs. At 804, the first BS identifies one or more guard RBs surrounding the identified set of RBs. At 806, the first BS transmits the PDSCH using the identified RBs with limited or no transmissions by either the first or second base stations in the guard RBs.

Figure 10:
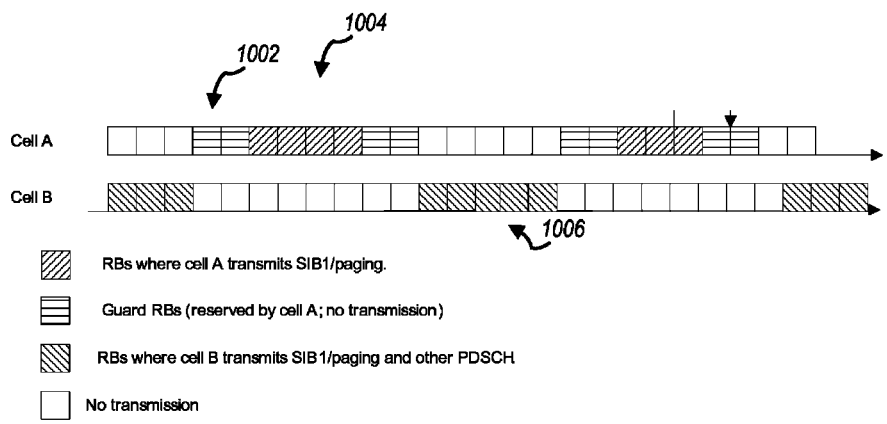
FIG. 10 shows example resource block (RB) allocation, in accordance with certain aspects of the present disclosure.

FIG. 10 illustrates an example allocation of RBs in accordance with the operations 900. As illustrated, a PDSCH may be sent in a first cell (cell A) utilizing a set of RBs 1004 surrounded by one or more guard RBs 1002. The guard tones 1002 may separate the PDSCH from potentially impacting broadband channel estimation by another UE trying to decode PDSCH transmissions sent in another cell (cell B) using RBs 1006. As illustrated, the RBs 1004 PDSCH and guard RBs 1002 may correspond to RBs in which there is limited or no transmission in the second cell.

A UE connected with cell A may see strong interference from cell B. If this UE is decoding PDSCH information from cell A at RBs 1004, it may still be able to use broadband channel estimation to decode PDSCH. In general, such channel estimation may lead to a poor channel estimation quality on RBs 1006 and 1002 due to the strong interference from cell B. However, with the protection provided by the guard RBs, the UE's channel estimation quality on RBs 1004 (those RBs carrying PDSCH from cell A) may be good enough for decoding PDSCH from cell A.

The solution illustrated in FIG. 10 may be transparent to a UE, by mandating the use of guard RBs from eNBs, therefore requiring no UE implementation change. Alternatively, the guard RBs may optionally be used by eNBs, in which case the presence of guard RBs may be signalled to a UE, so as to aid the UE's decision on whether it has to use a broadband channel estimation or a narrowband channel estimation.

The particular location of the guard RBs may depend on a particular resource allocation scheme used. For example, for Type 2 localized resource allocation, guard RBs may be located on each side of the assigned RBs for PDSCH. For Type 2 distributed resource allocation, the guard RBs may be located on each side of (some or all of) different portions of assigned RBs for PDSCH.

In any case, the (location and number of) guard RBs may be negotiated among eNBs or cells, for example, through a backhaul connection. According to certain aspects, the number of guard RBs may be configurable, for example via RRC signaling, or fixed. According to certain aspects, the number of guard RBs may be determined, for example, as a function of RBs used for PDSCH. In this case, an explicit signaling of the number of guard RBs may not be necessary-as a UE may figure out the number of guard RBs used for PDSCH.

Further, it will be appreciated that the techniques described herein may be applied to any transport channel mapped to PDSCH, such as a system information block (SIB), paging, Msg2, or a unicast PDSCH.

According to certain aspects, a UE employing a broadband channel estimation may ignore RBs near the edge of RBs allocated for PDSCH. This approach may allow a UE to successfully decode PDSCH even in the case where no guard RBs are used. For example, as strong neighboring cells may transmit in RBs right outside the SIB1/paging region, the UE may ignore RBs near the edge when decoding the PDSCH (e.g., by puncturing corresponding LLRs). In such a scenario, the eNB may schedule PDSCH on larger number of RBs to compensate for the UE's reduced decoding capability. The presence of guard RBs may be signalled to a UE, so as to aid the UE's decision on whether it has to discard RBs near the edge or not. UEs that employ narrowband channel estimation can use all the RBs where PDSCH is transmitted without needing to discard edge RBs.

Figure 11:
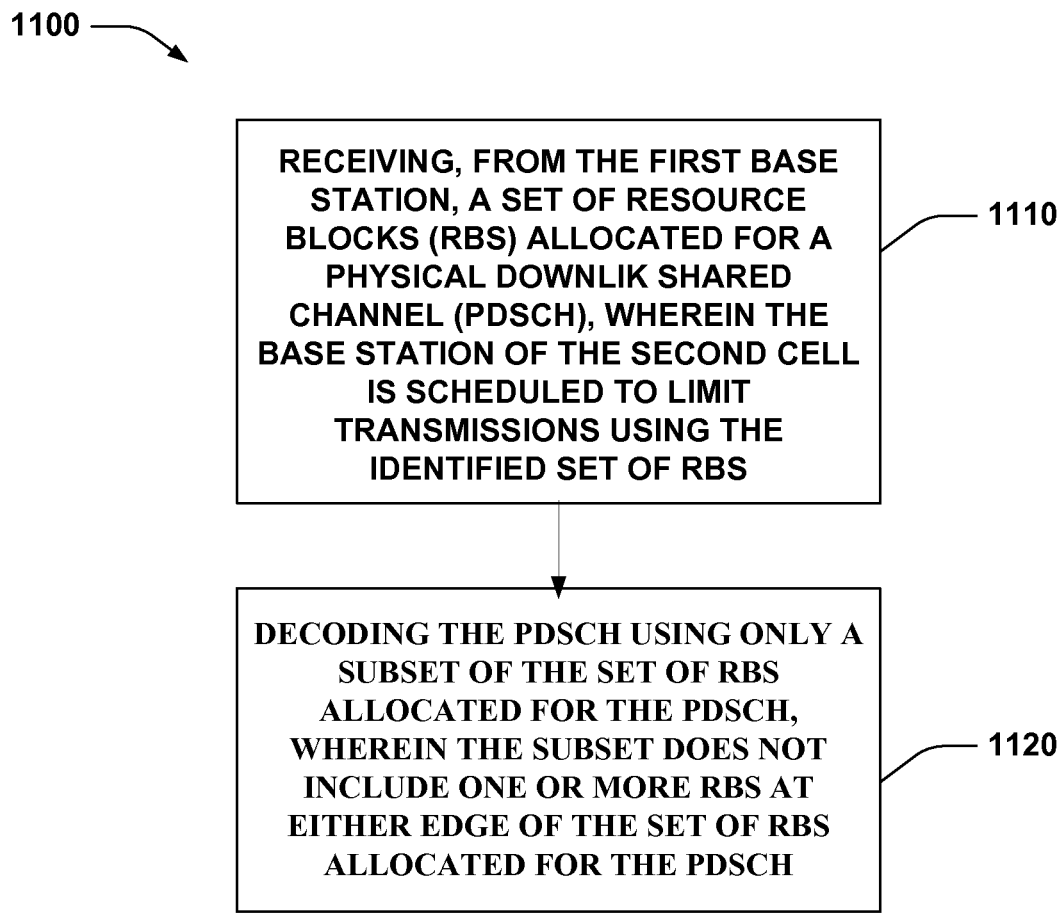
FIG. 11 shows example operations that may be performed by a UE, in accordance with certain aspects of the present disclosure.

FIG. 11 illustrates example operations 1100 that may be performed, for example, by a UE in a system in which at least first and second base stations share resource blocks (RBs) via a frequency division multiplexing (FDM) scheme. The operations 1100 begin, at 1102, by receiving, from the first base station, a set of resource blocks (RBs) allocated for a physical downlink shared channel (PDSCH), wherein the base station of the second cell is scheduled to limit transmissions using the identified set of RBs. At 1104, the UE decodes the PDSCH using only a subset of the set of RBs allocated for the PDSCH, wherein the subset does not include one or more RBs at either edge of the set of RBs allocated for the PDSCH.

Figure 12:
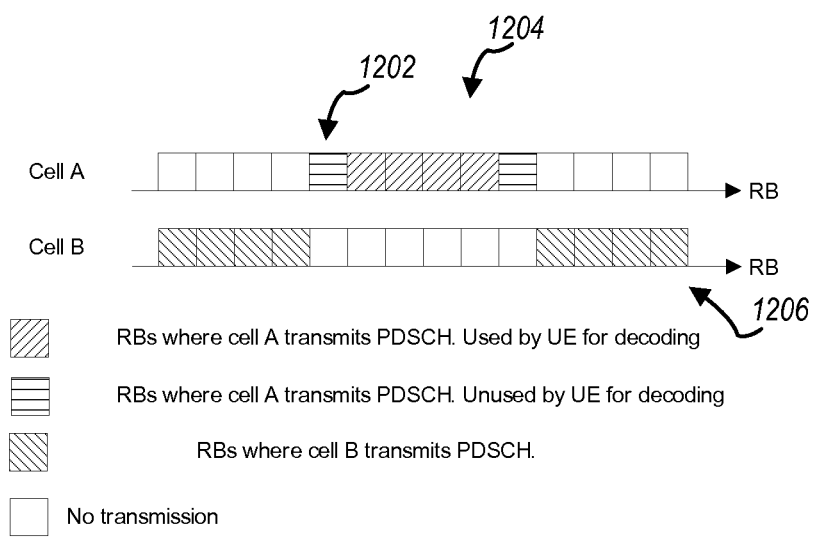
FIG. 12 shows example resource block (RB) allocation, in accordance with certain aspects of the present disclosure.

FIG. 12 illustrates an example allocation of RBs in accordance with the operations 1100. As illustrated, a PDSCH may be sent in a first cell (cell A) utilizing a set of RBs 1204, including a set of RBs 1202 at an edge near RBs 1206 used for PDSCH transmission in a second cell (Cell B). As indicated, a UE may not use the set of RBs 1202 for decoding PDSCH, as the broadband channel estimation on these RBs may be subject to interference by the PDSCH transmissions in cell B on RBs 1206. As illustrated, the UE may decode PDSCH using only RBs 1204 that correspond to RBs in which there is limited or no impact on UE's channel estimation from transmission in the second cell.

In this manner, a UE may use only a subset of the assigned RBs 1204, while ignoring RBs 1202. According to certain aspects, to account for this, an eNB may schedule PDSCH on a larger number of RBs than actually needed. In other words, this "over-allocation" may help compensate for the reduced decoding capability of the UE (reduced by ignoring RBs 1202). According to certain aspects, a UE that employs narrowband channel estimation may be able to use all the RBs where PDSCH is transmitted.

The scenarios and embodiments described herein may be applied to any HetNet, including, but not limited to, Femto-to-Femto network, Macro-to-Pico network and/or any other type of HetNet where the interfered BS may implement any of the functions described herein.

The techniques described herein may be implemented using any suitable means, which may include any suitable combination of hardware and/or software components. In one aspect, the aforementioned means may be processor(s), such as those described in the Figures above, configured to perform the functions described above. In another aspect, the aforementioned means may be a module or any apparatus configured to perform the functions recited by the aforementioned means.

The terms "module", "component," and the like, are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Those skilled in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or combinations of both, depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in random access memory (RAM), read only memory (ROM), programmable ROM (PROM), electrically programmable ROM (EPROM), electrically erasable ROM (EEPROM), registers, hard disk, a removable disk, a CD-ROM, or any other form of storage medium known in the art. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM). An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication in a wireless communications network in which at least a first base station of a first cell and a second base station of a second cell share resource blocks (RBs) via a frequency division multiplexing (FDM) scheme, the method comprising:
identifying, by the first base station, a set of RBs for transmitting a physical downlink shared channel (PDSCH), wherein the second base station is scheduled to limit transmissions using the identified set of RBs;
identifying one or more guard RBs surrounding the identified set of RBs; and transmitting the PDSCH using the identified RBs with limited or no transmissions by either the first or second base stations in the guard RBs;
wherein:
the identified set of RBs are a distributed resource allocation; and
the guard RBs comprise one or more RBs on each side of one or more different portions of the identified set of RBs.

2. The method of claim 1, wherein:
the wireless communications network comprises a heterogeneous network; and
the first and second cells are of different power class types.

3. The method of claim 1, further comprising:
negotiating with the second base station to identify the guard RBs.

4. The method of claim 1, wherein the use of guard RBs when transmitting PDSCH is mandated such that the first base station does not need to signal the number of guard RBs to a UE.

5. The method of claim 1, wherein a UE determines, based on an existence or absence of guard RBs used when transmitting the PDSCH, whether to use all or a subset of the set of RBs allocated for the PDSCH for decoding the PDSCH.

6. The method of claim 1, wherein a UE determines, based on an existence or absence of guard RBs used when transmitting the PDSCH, whether to use a broadband or a narrowband channel estimation.

7. The method of claim 1, wherein the number of guard RBs is configurable via radio resource control (RRC) signaling.

8. The method of claim 1, wherein the number of guard RBs is dependent on the number of RBs in the identified set of RBs.

9. The method of claim 1, wherein transmitting the PDSCH comprises transmitting at least one of:
a system information block (SIB), a paging message, or a response message msg2.

10. A method for wireless communication in a system in which at least a first base station of a first cell and a second base station of a second cell share resource blocks (RBs) via a frequency division multiplexing (FDM) scheme, the method comprising:
receiving, from the first base station, a set of RBs allocated for a physical downlink shared channel (PDSCH), wherein the second base station is scheduled to limit transmissions using the identified set of RBs; and
decoding the PDSCH using only a subset of the set of RBs allocated for the PDSCH, wherein the subset does not include one or more RBs at either edge of the set of RBs allocated for the PDSCH;
wherein decoding the PDSCH using only a subset of the set of RBs allocated for the PDSCH comprises puncturing logarithmic likelihood ratios (LLRs) for the one or more RBs at either edge of the set of RBs allocated for the PDSCH.

11. The method of claim 10, wherein:
the wireless communications network comprises a heterogeneous network; and
the first and second cells are of different power class types.

12. The method of claim 10, further comprising receiving, from the first base station, an allocation of an increased number of RBs to compensate for the decoding using only a subset of the set of RBs allocated for the PDSCH.

13. The method of claim 10, further comprising determining, based on an existence or absence of guard RBs used when transmitting the PDSCH, whether to use all or a subset of the set of RBs allocated for the PDSCH for decoding the PDSCH.

14. An apparatus for wireless communication in a wireless communications network in which at least a first base station of a first cell and a second base station of a second cell share resource blocks (RBs) via a frequency division multiplexing (FDM) scheme, the apparatus comprising:
means for identifying a set of RBs for transmitting a physical downlink shared channel (PDSCH), wherein the second base station is scheduled to limit transmissions using the identified set of RBs;
means for identifying one or more guard RBs surrounding the identified set of RBs; and
means for transmitting the PDSCH using the identified RBs with limited or no transmissions by either the first or second base stations in the guard RBs;
wherein:
the identified set of RBs are a distributed resource allocation; and
the guard RBs comprise one or more RBs on each side of one or more different portions of the identified set of RBs.

15. The apparatus of claim 14, wherein:
the wireless communications network comprises a heterogeneous network; and
the first and second cells are of different power class types.

16. The apparatus of claim 14, further comprising:
means for negotiating with the second base station to identify the guard RBs.

17. The apparatus of claim 14, wherein the use of guard RBs when transmitting PDSCH is mandated such that the first base station does not need to signal the number of guard RBs to a UE.

18. The apparatus of claim 14, wherein a UE determines, based on an existence or absence of guard RBs used when transmitting the PDSCH, whether to use all or a subset of the set of RBs allocated for the PDSCH for decoding the PDSCH.

19. The apparatus of claim 14, wherein a UE determines, based on an existence or absence of guard RBs used when transmitting the PDSCH, whether to use a broadband or a narrowband channel estimation.

20. The apparatus of claim 14, wherein the number of guard RBs is configurable via radio resource control (RRC) signaling.

21. The apparatus of claim 14, wherein the number of guard RBs is dependent on the number of RBs in the identified set of RBs.

22. The apparatus of claim 14, wherein the means for transmitting the PDSCH comprises means for transmitting at least one of:
a system information block (SIB), a paging message, or a response message msg2.

23. An apparatus for wireless communication in a system in which at least a first base station of a first cell and a second base station of a second cell share resource blocks (RBs) via a frequency division multiplexing (FDM) scheme, the apparatus comprising:
means for receiving, from the first base station, a set of RBs allocated for a physical downlink shared channel (PDSCH), wherein the second base station is scheduled to limit transmissions using the identified set of RBs; and
means for decoding the PDSCH using only a subset of the set of RBs allocated for the PDSCH, wherein the subset does not include one or more RBs at either edge of the set of RBs allocated for the PDSCH;
wherein decoding the PDSCH using only a subset of the set of RBs allocated for the PDSCH comprises puncturing logarithmic likelihood ratios (LLRs) for the one or more RBs at either edge of the set of RBs allocated for the PDSCH.

24. The apparatus of claim 23, wherein: the wireless communications network comprises a heterogeneous network; and the first and second cells are of different power class types.

25. The apparatus of claim 23, further comprising means for receiving, from the first base station, an allocation of an increased number of RBs to compensate for the decoding using only a subset of the set of RBs allocated for the PDSCH.

26. The apparatus of claim 23, further comprising means for determining, based on an existence or absence of guard RBs used when transmitting the PDSCH, whether to use all or a subset of the set of RBs allocated for the PDSCH for decoding the PDSCH.

27. An apparatus for wireless communication in a wireless communications network in which at least a first base station of a first cell and a second base station of a second cell share resource blocks (RBs) via a frequency division multiplexing (FDM) scheme, the apparatus comprising:
at least one processor configured to identify a set of RBs for transmitting a physical downlink shared channel (PDSCH), wherein the second base station is scheduled to limit transmissions using the identified set of RBs, identify one or more guard RBs surrounding the identified set of RB, and transmit the PDSCH using the identified RBs with limited or no transmissions by either the first or second base stations in the guard RBs; and
a memory coupled with the at least one processor;
wherein:
the identified set of RBs are a distributed resource allocation; and
the guard RBs comprise one or more RBs on each side of one or more different portions of the identified set of RBs.

28. An apparatus for wireless communication in a system in which at least a first base station of a first cell and a second base station of a second cell share resource blocks (RBs) via a frequency division multiplexing (FDM) scheme, the apparatus comprising:
at least one processor configured to receive, from the first base station, a set of RBs allocated for a physical downlink shared channel (PDSCH), wherein the second base station is scheduled to limit transmissions using the identified set of RBs and decode the PDSCH using only a subset of the set of RBs allocated for the PDSCH, wherein the subset does not include one or more RBs at either edge of the set of RBs allocated for the PDSCH; and
a memory coupled with the at least one processor;

wherein decode the PDSCH using only a subset of the set of RBs allocated for the PDSCH comprises puncture logarithmic likelihood ratios (LLRs) for the one or more RBs at either edge of the set of RBs allocated for the PDSCH.

29. A computer program product comprising a non-transitory computer readable medium having instructions stored thereon for wireless communication in a wireless communications network in which at least a first base station of a first cell and a second base station of a second cell share resource blocks (RBs) via a frequency division multiplexing (FDM) scheme, the instructions executable by one or more processors for:
identifying a set of RBs for transmitting a physical downlink shared channel (PDSCH), wherein the second base station is scheduled to limit transmissions using the identified set of RBs;
identifying one or more guard RBs surrounding the identified set of RBs; and
transmitting the PDSCH using the identified RBs with limited or no transmissions by either the first or second base stations in the guard RBs;
wherein:
the identified set of RBs are a distributed resource allocation; and
the guard RBs comprise one or more RBs on each side of one or more different portions of the identified set of RBs.

30. A computer program product comprising a non-transitory computer readable medium having instructions stored thereon for wireless communication in a wireless communications network in which at least a first base station of a first cell and a second base station of a second cell share resource blocks (RBs) via a frequency division multiplexing (FDM) scheme, the instructions executable by one or more processors for:
receiving, from the first base station, a set of RBs allocated for a physical downlink shared channel (PDSCH), wherein the second base station is scheduled to limit transmissions using the identified set of RBs; and
decoding the PDSCH using only a subset of the set of RBs allocated for the PDSCH, wherein the subset does not include one or more RBs at either edge of the set of RBs allocated for the PDSCH;
wherein decoding the PDSCH using only a subset of the set of RBs allocated for the PDSCH comprises puncturing logarithmic likelihood ratios (LLRs) for the one or more RBs at either edge of the set of RBs allocated for the PDSCH.

* * * * *